No. 830,836. PATENTED SEPT. 11, 1906.
C. W. HUNT.
ORE HOIST.
APPLICATION FILED JUNE 20, 1906.
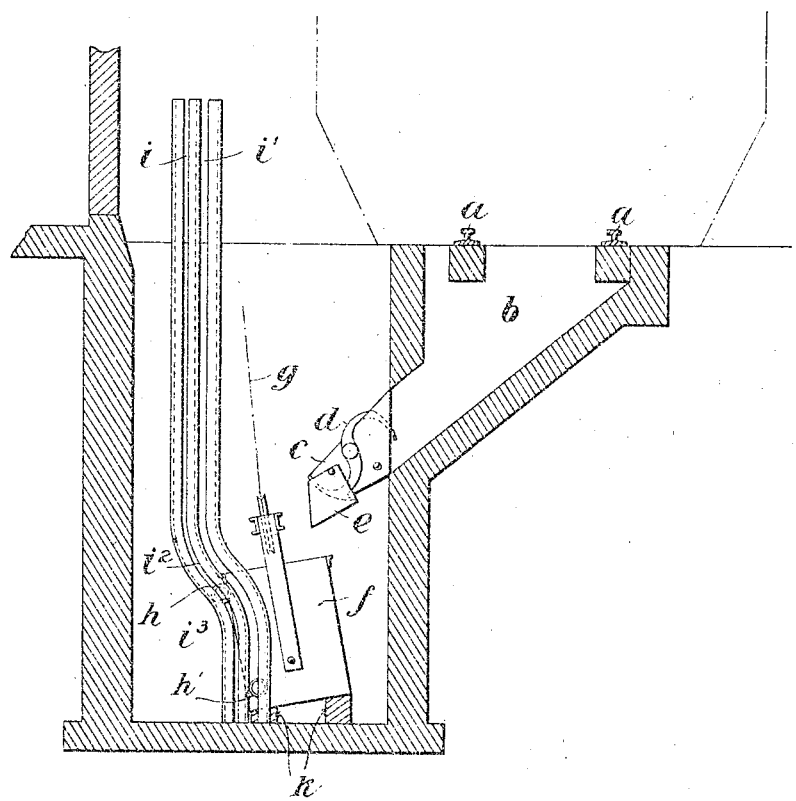
Attest:
Inventor:
Charles Wallace Hunt
by Redding, Kiddle & Greeley
Attys.

UNITED STATES PATENT OFFICE.

CHARLES WALLACE HUNT, OF WEST NEW BRIGHTON, NEW YORK.

ORE-HOIST.

No. 830,836.

Specification of Letters Patent.

Patented Sept. 11, 1906.

Application filed June 20, 1906. Serial No. 322,518.

*To all whom it may concern:*

Be it known that I, CHARLES WALLACE HUNT, a citizen of the United States, residing in West New Brighton, borough of Richmond, city of New York, in the State of New York, have invented certain new and useful Improvements in Ore-Hoists, &c., of which the following is a specification, reference being had to the accompanying drawings, forming a part hereof.

This invention relates to apparatus for hoisting ore or other materials in which a bucket or skip is guided by suitable guides in its travel between the point where it is filled and the point where it is discharged.

Ordinarily the guides for the skip are straight at and near the point where the skip is filled, and in order that the skip may be far enough from the chute through which the coal or ore or other material is discharged into it to clear the end of such chute in its travel, while at the same time the coal or ore shall not dribble down from the end of the chute outside of the skip, but be discharged into the skip so long as the delivery continues, it is common to provide the chute with an extension which projects slightly over the side of the skip and must be turned back before the skip is raised. In the practical operation of such apparatus it not infrequently happens that the skip is started on its upward movement before the chute extension is turned back, with the result that the chute extension is sometimes torn away.

It is the object of this invention to overcome the difficulties above alluded to and to provide means whereby the skip shall be properly positioned beneath the chute or its extension to receive all of the coal or ore discharged from such chute, no matter how slowly it may run, and in its movement after being filled shall clear the end of the chute or extension, even if the extension, if used, is not turned back out of the way. In accordance with the invention the vertical guides for the skip are given an inward compound curve or bend just below the horizontal plane of the lip of the chute, so that the skip shall come to rest beneath the end of the chute or its extension and in its upward movement shall be carried away from the end of the chute or its extension sufficiently to clear the same and shall continue its upward movement without danger of carrying away the extension or the end of the chute.

The invention will be more fully described hereinafter with reference to the accompanying drawing, in which is illustrated, partly in section and partly in elevation, so much of a coal or ore hoisting apparatus as is necessary to enable the application of the invention to be understood.

In the embodiment of the invention illustrated in the drawing there are shown rails $a\ a$ to direct a loaded car over the hopper $b$, into which the load may be discharged. The latter is provided with a discharge-chute $c$ and suitable valve $d$, which may be of any usual or preferred construction. The chute is also shown as provided with an extension $e$, although no extension is necessary in connection with the use of the present invention. The skip $f$ may be of any desired form and construction and may be provided with a hoisting-rope $g$ (indicated by a broken line) or otherwise connected suitably to the hoisting-engine. (Not shown.) The skip is also shown as provided with projecting studs or rollers $h\ h'$, which engage, respectively, the guides $i$ and $i'$, by which the skip is directed in its movements and is caused to discharge its load at the proper point. The guides $i$ and $i'$ are shown as substantially vertical; but near the horizontal plane of the mouth of the chute $c$ they are curved or inclined inwardly, as indicated at $i^2$, and again downwardly, as indicated at $i^3$, so that the skip $f$, although it passes the end of the chute or extension when moving in either direction without striking the same, it nevertheless in its downward movement below the end of the chute is carried beneath the end of the chute, as clearly shown in the drawing, and comes to rest, as upon the blocks $k$, provided therefor, with the end of the chute or its extension projecting over the near side of the skip. In this position the skip receives all of the coal or other material delivered by the chute without permitting any of such material to fall outside of the skip no matter how nearly closed may be the valve $d$ nor how slowly the coal runs from the chute. Furthermore, as will be seen by examination of the drawing, when the skip moves upward its edge will clear the lip of the chute or its extension and the danger of carrying away the chute or its extension will be wholly obviated.

I claim as my invention—

1. In an apparatus of the character described the combination with a chute and a vertically-movable skip of guides for said skip standing at a distance from the end of the chute to permit the skip to clear the same in its movement and carried inward toward the vertical plane of the chute below the same to guide the skip below the end of the chute.

2. In an apparatus of the character described the combination with a chute and a vertically-movable skip of guides for the skip such guides being vertical above the plane of the end of the chute and at a distance from the end of the chute to permit the skip to clear the end of the chute, and curved inwardly and downwardly below such plane to carry the skip inwardly below the end of the chute.

This specification signed and witnessed this 18th day of June, A. D. 1906.

CHARLES WALLACE HUNT.

In presence of—
  L. D. FORMAN,
  GEO. K. JENCKES.